Patented Mar. 30, 1937

2,075,204

UNITED STATES PATENT OFFICE 2,075,204

HYDRATION OF OLEFINES

Walter Philip Joshua, Cheam, Herbert Muggleton Stanley, Tadworth, and John Blair Dymock, Sutton, England No Drawing. Application December 22, 1933, Serial No. 703,675. In Great Britain January 24, 1933

12 Claims. (Cl. 260—156)

The present invention relates to the production of oxygenated aliphatic compounds catalytically from water vapour and olefines other than ethylene, particularly from propylene and from butene 1 or 2 and/or isobutylene. In particular the present invention enables water vapour to be combined with propylene, and with butene 1 or 2 and/or isobutylene yielding respectively isopropyl alcohol and secondary and/or tertiary alcohols together with some ketone corresponding to the secondary alcohol obtained and/or small amounts of primary alcohols.

According to the present invention the water vapour and the olefine particularly butene 1 or 2 and/or isobutylene or propylene are caused to combine at high temperatures at atmospheric or increased pressures in the presence of a catalyst compounded from phosphoric acid with calcium and/or barium and/or strontium and/or magnesium, or the oxides or other compounds thereof, the amount of phosphoric acid present in the catalyst being in excess of that required to form the orthophosphate of the element or elements employed. It is also advantageous to incorporate boron as a secondary component in the mixture, in which case the amount of phosphoric acid must also be in excess of that required to form the orthophosphate of the boron as well as of the primary element or elements.

Suitable catalysts may be prepared according to the method described in our co-pending application Ser. No. 692,222 or the catalysts as such may be used in the solid state in the form of granules, flakes and so forth or may be supported on inert carriers, such as electrode carbon and the like, or inert materials may be impregnated with the catalyst in liquid form and may be subsequently dried.

The reaction may be carried out at temperatures of 100–350° C., but we prefer to use temperatures above 150° C. Atmospheric pressure may be employed or increased pressure up to 250 atmospheres may be used. The catalysts may be used alone or in conjunction with other catalysts known to favour the direct combination of olefines and steam.

The following examples illustrate the manner in which the invention may be carried into effect and the results obtained:—

Example 1

A catalyst consisting of 1.0 mol. CaO; 0.5 mol. $B_2O_3$ and 2.6 mols $H_3PO_4$ was prepared by mixing the requisite amounts of lime, $B_2O_3$ and $H_3PO_4$ and evaporating, with addition of 5 per cent. linseed oil during the final stages of evaporation, followed by baking at 200° C. and tableting with 3 per cent. of linseed oil, the tablets being formed as granules of ¼ inch size and finally baked at 200° C.

Over 100 cc. of this catalyst at 260° C. there was passed under a total pressure of 20 atmospheres, a mixture of 9.6 mols of propylene and 10.4 mols. of steam at a gas rate of about 400 litres of propylene per hour, calculated at normal temperature and pressure. The hourly output of isopropyl alcohol was 17.6 grams in the form of a 4.75 per cent. aqueous condensate. Together with isopropyl alcohol, small amounts of acetone and n-propyl alcohol were produced but no polymers.

Example 2

Over 100 cc. of the same catalyst as in Example 1 but at a temperature of 240° C., a mixture of 4 mols of steam and 6 mols of a mixture of butene 1 and butene 2 was passed under a total pressure of 10 atmospheres at a gas rate of about 400 litres of mixed butenes per hour, calculated at normal temperature and pressure. Secondary butyl alcohol was produced at the rate of about 2.50 grams per hour in the form of a 1.2 per cent. aqueous condensate. Quantities of methyl ethyl ketone were also produced.

Example 3

A catalyst consisting of 1.0 mol. CaO; 0.5 mol. $B_2O_3$, and 3.0 mols. $H_3PO_4$ was prepared by evaporating down the requisite amounts of lime, $B_2O_3$ and $H_3PO_4$ and incorporating 5 per cent. of linseed oil in the final stages of evaporation. The mass was baked at 200° C. powdered and tableted with a further addition of 3 per cent. linseed oil, the tablets being formed as granules of ¼ inch size and finally baked at 200° C. for 2 hours.

Over 100 cc. of this catalyst at 260° C. was passed, under a total pressure of 20 atmospheres, a gas mixture of 13.2 mols of steam and 6.8 mols of propylene, at a gas velocity of about 400 litres of propylene per hour calculated at normal temperature and pressure. There were produced 29.0 grams of isopropyl alcohol per hour in the form of a 3.96 per cent. aqueous condensate. Small amounts of acetone and n-propyl alcohol were simultaneously formed but no polymers were produced.

Example 4

A gaseous mixture containing 13.2 mols of steam and 16.8 mols of propylene was passed, at a total pressure of 30 atmospheres, over 100 cc.

of the same catalyst as in Example 3 and at the same temperature, i. e. 260° C., the gas velocity being maintained at about 1000 litres of propylene per hour, measured at normal temperature and pressure. The hourly output of isopropyl alcohol was 64.5 grams in the form of an 8.5 per cent. aqueous condensate. Small amounts of acetone and n-propyl alcohol, but no polymers, were simultaneously produced.

What we claim is:—

1. The method of producing oxygenated aliphatic compounds from olefines other than ethylene comprising combining the olefine with water vapor at elevated temperature between 100° C. and 350° C. in the presence of a solid catalyst comprising essentially phosphoric acid and a substantial amount of metal taken from a group consisting of calcium, barium, strontium and magnesium, the amount of phosphoric acid present in the catalyst being in excess of that required to form the corresponding ortho-phosphate but not in so great an excess as to make the catalyst fluid.

2. The method of producing isopropyl alcohol comprising combining propylene with water vapor at elevated temperature between 100° C. and 350° C. in the presence of a solid catalyst comprising essentially phosphoric acid and a substantial amount of a metal taken from a group consisting of calcium, barium, strontium and magnesium, the amount of phosphoric acid present in the catalyst being in excess of that required to form the corresponding ortho-phosphate but not in so great an excess as to make the catalyst fluid.

3. The method of producing isopropyl alcohol comprising combining propylene with water vapor at elevated temperature between 100° C. and 350° C. and at superatmospheric pressure up to about 250 atmospheres in the presence of a solid catalyst comprising essentially phosphoric acid and a substantial amount of a metal taken from a group consisting of calcium, barium, strontium and magnesium, the amount of phosphoric acid present in the catalyst being in excess of that required to form the corresponding ortho-phosphate but not in so great an excess as to make the catalyst fluid.

4. The method of producing isopropyl alcohol comprising combining propylene with water vapour at elevated temperature between 100° C. and 350° C. in the presence of a solid catalyst comprising essentially phosphoric acid and boron and any of the metals taken from the group consisting of calcium, barium, strontium, magnesium, the amount of phosphoric acid present in the catalyst being in excess of that required to form the corresponding orthophosphates of boron and of the group metal selected but not in so great an excess as to make the catalyst fluid.

5. The method of producing isopropyl alcohol comprising combining propylene with water vapor at elevated temperature between 100° C. and 350° C. in the presence of a solid catalyst compounded essentially from phosphoric acid and a phosphate forming substance containing a substantial amount of a metal taken from a group consisting of calcium, barium, strontium and magnesium, the amount of phosphoric acid present in the catalyst being in excess of that required to form the corresponding ortho-phosphate but not in so great an excess as to make the catalyst fluid.

6. The method of producing isopropyl alcohol comprising combining propylene with water vapor at elevated temperature between 100° C. and 350° C. and in the presence of a solid catalyst comprising essentially phosphoric acid and boron together with a substantial amount of any of the metals taken from the group consisting of calcium, barium, strontium, magnesium, the amount of phosphoric acid present in the catalyst being in excess of that required to form the corresponding orthophosphates of the boron and of the group metal selected, but not in so great an excess as to make the catalyst fluid.

7. The method of producing from water vapor and olefines higher than ethylene the corresponding alcohols comprising combining the respective olefine with water vapor at elevated temperature between 100° C. and 350° C. in the presence of a solid catalyst comprising essentially phosphoric acid and a substantial amount of a metal taken from a group consisting of calcium, barium, strontium and magnesium, the amount of phosphoric acid present in the catalyst being in excess of that required to form the corresponding ortho-phosphate but not in so great an excess as to make the catalyst fluid.

8. The method of producing from water vapor and olefines higher than ethylene the corresponding alcohols comprising combining the respective olefine with water vapor at elevated temperature between 100° C. and 350° C. and at superatmospheric pressure up to about 250 atmospheres in the presence of a solid catalyst comprising essentially phosphoric acid and a substantial amount of a metal taken from a group consisting of calcium, barium, strontium and magnesium, the amount of phosphoric acid present in the catalyst being in excess of that required to form the corresponding ortho-phosphate but not in so great an excess as to make the catalyst fluid.

9. The method of producing from water vapour and olefines higher than ethylene the corresponding alcohols comprising combining the respective olefine with water vapour at elevated temperature between 100° C. and 350° C. in the presence of a solid catalyst comprising essentially phosphoric acid and boron and any of the metals taken from the group consisting of calcium, barium, strontium, magnesium, the amount of phosphoric acid present in the catalyst being in excess of that required to form the corresponding orthophosphates of boron and of the group metal selected but not in so great an excess as to make the catalyst fluid.

10. The method of producing from water vapor and olefines higher than ethylene the corresponding alcohols comprising combining the respective olefine with water vapor at elevated temperature between 100° C. and 350° C. in the presence of a solid catalyst compounded essentially from phosphoric acid and a phosphate forming substance containing a substantial amount of a metal taken from a group consisting of calcium, barium, strontium and magnesium, the amount of phosphoric acid present in the catalyst being in excess of that required to form the corresponding orthophosphate but not in so great an excess as to make the catalyst fluid.

11. The method of producing from water vapor and olefines higher than ethylene, the corresponding alcohols, comprising combining the respective olefine with water vapor at elevated temperature between 100° C. and 350° C. in the presence of a solid catalyst comprising essentially phosphoric acid and boron together with a substantial amount of any of the metals taken from the group consisting of calcium, barium, strontium, magnesium, the amount of phosphoric acid present in the catalyst being in excess of that required to form the corresponding orthophosphates of the boron and of the group metal selected, but not in so great an excess as to make the catalyst fluid.

12. The method of producing from water vapor and olefines higher than ethylene, the corresponding alcohols, comprising combining the respective olefine with water vapor at elevated temperature between 100° C. and 350° C. and at superatmospheric pressure up to about 250 atmospheres in the presence of a solid catalyst comprising essentially phosphoric acid and boron together with a substantial amount of any of the metals taken from the group consisting of calcium, barium, strontium, magnesium, the amount of phosphoric acid present in the catalyst being in excess of that required to form the corresponding orthophosphates of the boron and of the group metal selected, but not in so great an excess as to make the catalyst fluid.

WALTER PHILIP JOSHUA.
HERBERT MUGGLETON STANLEY.
JOHN BLAIR DYMOCK.